US011284745B2

(12) United States Patent
Shei et al.

(10) Patent No.: US 11,284,745 B2
(45) Date of Patent: Mar. 29, 2022

(54) INFRARED TOASTER

(71) Applicant: Marmon Foodservice Technologies, Inc., Osseo, MN (US)

(72) Inventors: Steven Shei, Fort Wayne, IN (US); Loren Veltrop, Chicago, IL (US); Henry Africano, Chicago, IL (US); David E. Paton, Bartlett, IL (US); Nicholas Paul Mandarino, Aurora, IL (US)

(73) Assignee: Marmon Foodservice Technologies, Inc., Osseo, MN (US)

(*) Notice: Subject to any disclaimer, the term of this patent is extended or adjusted under 35 U.S.C. 154(b) by 198 days.

(21) Appl. No.: 16/448,359

(22) Filed: Jun. 21, 2019

(65) Prior Publication Data

US 2019/0387926 A1 Dec. 26, 2019

Related U.S. Application Data

(60) Provisional application No. 62/688,127, filed on Jun. 21, 2018.

(51) Int. Cl.
*A47J 37/07* (2006.01)
*A47J 37/08* (2006.01)
*A47J 27/14* (2006.01)

(52) U.S. Cl.
CPC ............. *A47J 37/085* (2013.01); *A47J 27/14* (2013.01); *A47J 37/0857* (2013.01)

(58) Field of Classification Search
CPC ................ A47J 37/0623; A47J 37/0629; A47J 37/0635; A47J 37/0641; A47J 37/0664; A47J 37/08; A47J 37/0807; A47J 37/085; A47J 37/0857; A47J 37/0864;
(Continued)

(56) References Cited

U.S. PATENT DOCUMENTS

| | | |
|---|---|---|
| 1,900,737 A | 3/1933 | Rohne |
| 2,316,699 A | 4/1943 | Myers |
| 3,693,536 A | 9/1972 | Carville et al. |

(Continued)

FOREIGN PATENT DOCUMENTS

| | | |
|---|---|---|
| DE | 102013020214 A1 | 6/2015 |
| EP | 0563698 B1 | 1/1997 |

(Continued)

OTHER PUBLICATIONS

International Search Report and Written Opinion for PCT/US2020/021977, dated Jun. 12, 2020.
(Continued)

*Primary Examiner* — Hung D Nguyen
(74) *Attorney, Agent, or Firm* — Andrus Intellectual Property Law, LLP

(57) ABSTRACT

An infrared source is arranged relative to support for bread product and operates to direct IR energy to the bread product. A light source is arranged relative to the support and operates to illuminate the bread product and a camera operates to capture images of the bread product. A processor receives the images from the camera. The processor compares successive images received from the camera. Based upon the comparison, the processor operates the IR source to achieve a predetermined toasting level of the bread product.

21 Claims, 12 Drawing Sheets

(58) Field of Classification Search
CPC .. A47J 37/0871; A47J 37/0892; A47J 27/004; A47J 27/14
USPC ......... 99/325, 334, 385, 386, 388, 389, 393, 99/443 C
See application file for complete search history.

(56) References Cited

U.S. PATENT DOCUMENTS

| | | | |
|---|---|---|---|
| 4,474,498 | A | 10/1984 | Smith |
| 4,873,107 | A | 10/1989 | Archer |
| 5,131,841 | A | 7/1992 | Smith |
| 5,277,105 | A | 1/1994 | Bruno |
| 5,673,610 | A | 10/1997 | Stuck |
| 6,305,273 | B1 | 10/2001 | Sherman |
| 6,365,210 | B1 | 4/2002 | Schaible, II et al. |
| 6,444,955 | B1 | 9/2002 | Loveless |
| 6,559,882 | B1 | 5/2003 | Kerchner |
| 6,595,117 | B1 | 7/2003 | Jones |
| 6,817,283 | B2 | 11/2004 | Jones |
| 6,853,920 | B2 | 2/2005 | Hsiung et al. |
| 7,067,777 | B2 | 6/2006 | Lee et al. |
| 7,217,906 | B2 | 5/2007 | Veltrop |
| 7,424,848 | B2 | 9/2008 | Jones |
| 7,765,918 | B2 | 8/2010 | Garniss et al. |
| D634,154 | S | 3/2011 | Agnello et al. |
| 8,637,792 | B2 | 1/2014 | Agnello et al. |
| 8,789,459 | B2 | 7/2014 | Chung et al. |
| 2004/0206248 | A1 | 10/2004 | Lawson |
| 2005/0173400 | A1 | 8/2005 | Cavada et al. |
| 2006/0081135 | A1 | 4/2006 | Britton et al. |
| 2006/0218057 | A1 | 9/2006 | Fitzpatrick et al. |
| 2007/0075067 | A1 | 4/2007 | Beesley et al. |
| 2007/0254078 | A1 | 11/2007 | Calzada et al. |
| 2008/0044167 | A1 | 2/2008 | Cavada et al. |
| 2009/0034944 | A1 | 2/2009 | Burtea et al. |
| 2010/0239724 | A1 | 9/2010 | Veltrop et al. |
| 2010/0275789 | A1 | 11/2010 | Lee et al. |
| 2011/0303100 | A1 | 12/2011 | Agnello et al. |
| 2012/0294595 | A1 | 11/2012 | Veltrop et al. |
| 2012/0295210 | A1 | 11/2012 | Veltrop et al. |
| 2014/0322408 | A1 | 10/2014 | Khosla et al. |
| 2015/0289324 | A1 | 10/2015 | Rober et al. |
| 2016/0120362 | A1* | 5/2016 | Fields ............... A47J 37/08 99/378 |
| 2016/0198885 | A1 | 7/2016 | Logan et al. |
| 2016/0327281 | A1 | 11/2016 | Bhogal et al. |
| 2017/0074522 | A1 | 3/2017 | Cheng |
| 2017/0079471 | A1 | 3/2017 | Riefenstein |
| 2017/0115008 | A1 | 4/2017 | Erbe et al. |
| 2017/0195542 | A1 | 7/2017 | Thomas et al. |
| 2017/0332841 | A1 | 11/2017 | Teischmann |
| 2018/0202667 | A1* | 7/2018 | Cheng ............... H04N 5/232 |
| 2018/0289209 | A1 | 10/2018 | Yazvin et al. |
| 2019/0167040 | A1* | 6/2019 | Bauer ............... A47J 37/044 |

FOREIGN PATENT DOCUMENTS

| | | |
|---|---|---|
| WO | 2002060302 | 8/2002 |
| WO | WO 02060302 A2 | 8/2002 |
| WO | 2007013031 | 2/2007 |
| WO | WO 2014053002 A2 | 4/2014 |
| WO | 2016131109 | 2/2016 |

OTHER PUBLICATIONS

International Search Report and Written Opinion issued in corresponding PCT/US2019/038421, dated Aug. 19, 2019.

* cited by examiner

INFRARED TOASTER

CROSS-REFERENCE TO RELATED APPLICATIONS

The present application claims priority of U.S. Provisional Patent Application No. 62/688,127, filed on Jun. 21, 2018, the content of which is hereby incorporated by reference in its entirety.

BACKGROUND

Many restaurants serve toasted breads and toasted English muffins as regular menu items. Many of those menu items include sandwiches that are comprised of toasted English muffins or toasted bread.

Toasted food products have a distinctly different flavor than to the same products prior to toasting. Toasting a food product also changes the bread product's color and its texture. In addition to changing flavor, color and texture, the toasting process often gives off a pleasing aroma.

Toasting food products like sliced bread, English muffins, bagels, pizza and other bread products is usually accomplished using infrared energy emitted from one or more electrically-heated wires in a toaster or broiler. The process of toasting, is the result of a chemical reaction known as the Maillard reaction. The Maillard reaction is considered to be the reaction between carbohydrates and proteins that occurs upon heating and which produces toasting.

It is believed that when the Maillard reaction goes too far or too long, carbohydrates in a bread product will oxidize completely and form carbon. Carbon absorbs light. The surface of a burned bread product therefore appears black. The term "burn" is therefore considered to be the thermally-induced oxidation of carbohydrates to a point where the carbon content of the bread product surface is high enough to absorb visible light that impinges on the bread product surface and therefore makes the surface of the bread product appear to an ordinary observer to be black in color.

A well-known problem with prior art toasters of all kinds is that they often cannot consistently achieve a uniform toasting across bread products in the same amount of time. Because of their mass, surface irregularities and temperatures, bread products like English muffins are especially difficult to uniformly and consistently toast in a short amount of time period because the peaks and valleys of each English muffin's surface are at different distances from the IR source that effectuates the toasting process. Since many restaurant operators need and prefer to be able to toast bread products like English muffins as quickly as possible, attempts to shorten toasting time by simply increasing the input thermal energy usually results in more bread products being burned rather than toasted. A toaster and a method of toasting food products like bread and English muffins and which can consistently provide uniform browning in a relatively short period of time would be an improvement over the prior art.

BRIEF DISCLOSURE

In an example of a toaster, a support is configured to hold a bread product. An infrared source is arranged relative to the support and operates to direct IR energy to the bread product on the support. A light source is arranged relative to the support and operates to illuminate the bread product on the support while the IR source operates to direct the IR energy. A camera operates to capture images of the bread product on the support. A processor receives the images from the camera. The processor analyzes successive images received from the camera. Based upon the analysis, the processor operates the IR source to achieve a predetermined toasting level of the bread product.

In examples of the toaster, the processor operates the IR source to terminate operation directing IR energy when the predetermined toasting level is reached. The comparison performed by the processor calculating a difference image using a current acquired image of the images from the camera and evaluating the difference image based upon the predetermined toasting level. The processor isolates pixels associated with the bread product in each of the images received from the camera. The processor evaluates the isolated pixels of the difference image based upon the predetermined toasting level. The processor calculates an average pixel value from the isolated pixels of the difference images and compares the average pixel value to the predetermined toasting level. The isolated pixels of the difference image may each have a pixel difference value and the average pixel value may be an average of the difference values. The isolated pixels of the difference image may each have a normalized difference value and the average pixel value may be an average of the normalized pixel values. The normalized difference values are normalized to an expected toasting range based upon an identification of a type of the bread product. The processor may apply edge detection to the captured images from the camera to isolate pixels in each of the images associated with the bread product.

In further examples of the toaster, the processor receives an input indicative of the predetermined toasting level. The input may be an identification of a bread product type and a doneness. The processor may be communicatively connected to a kitchen management system which receives a customer order, identifies a toasted bread product for the received customer order and electronically communicates the bread product type and the doneness of the toasted bread product for the received customer order to the processor. The supplemental light source may be a white light source. The supplemental light source may provide light energy limited to wavelengths between 380 nm and 570 nm. The images of the bread product may be grayscale. The IR source may be configured as an annulus and the camera is positioned centrally to the IR source. The camera may include a wide-angle lens. A forced gas source and a duct open about the camera between the camera and the IR source to produce a flow of forced gas about the camera. The support may be a tray configured to hold the bread product relative to the IR source and the processor operates the tray to release the bread product when the predetermined toasting level is reached. The support may be a conveyor operable to receive the bread product and move the bread product into a position relative to the IR source, the processor operates the conveyor to move the bread product away from the IR source when the predetermined toasting level is reached.

DETAILED DISCLOSURE

Figure 1:
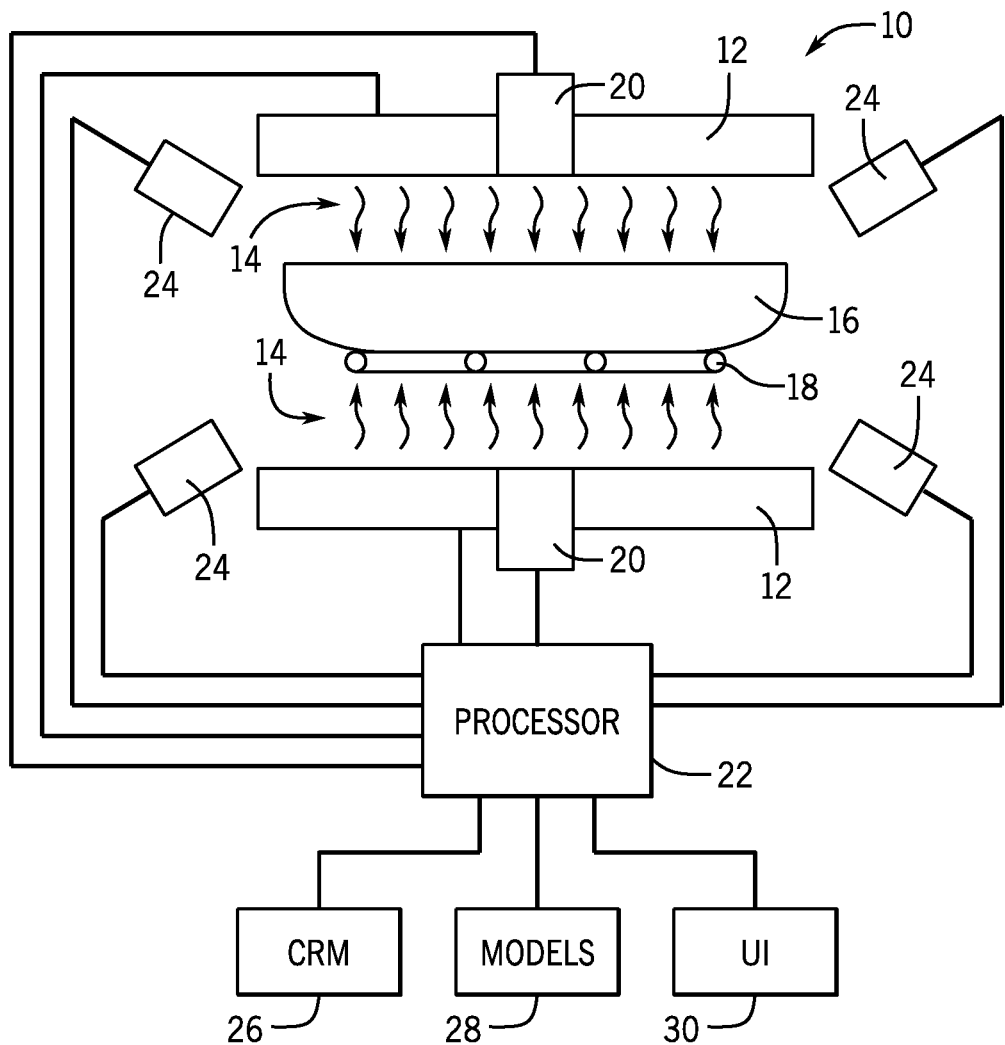
FIG. 1 is a system diagram of an exemplary embodiment of a toaster.

FIG. 1 depicts an exemplary embodiment of a toaster 10. The toaster 10 uses at least one infrared (IR) source 12, and, as depicted in FIG. 1, exemplarily two IR sources 12. The IR sources may take the form of one or more IR emitting LEDs, for example, an array arrangement of IR emitting LEDs. It will be recognized that there are other sources of IR energy which may be used in other embodiments, including, but not limited to electrified wire coils, which when energized with electrical current, are known to heat and emit IR energy. In one example, the IR source 12 may be a 1,200 watt electrically resistive heating coil. The IR sources 12 are arranged to direct IR energization 14 at a food product 16. The food product 16 is exemplarily a bread product that is desired to be toasted, although thermal treatments, exemplarily cooking, searing, broiling, or baking may be achieved in other embodiments. The bread products may include, but are not limited to sliced bread, English muffins, bagels, pizza, and flat bread, rolls, or buns.

Figure 2:
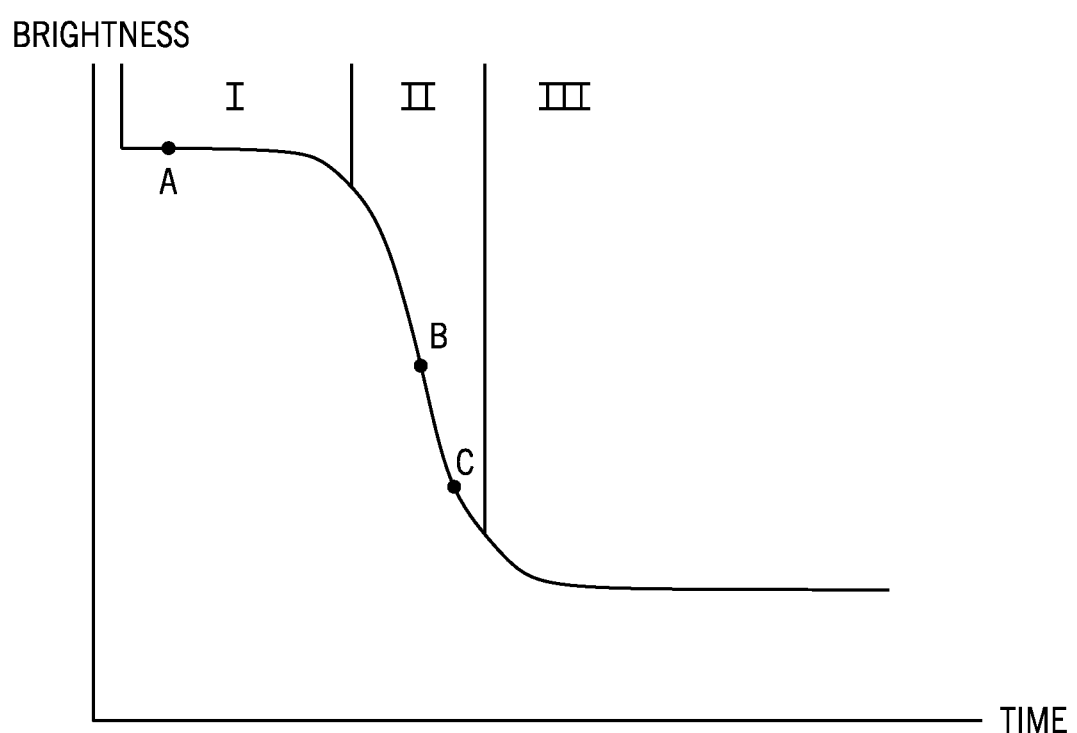
FIG. 2 is a graph of change in bread product surface color over time while toasting.

As previously noted, the challenge to toasting equipment is to quickly provide the amount of energy to the food product 16 to achieve a desired level or amount of toasting of the exterior of the food product, without overtoasting or undertoasting the food product within a narrow quality range. FIG. 2 is a graph that exemplarily represents the general change in color of a bread product as it is toasted. From the S curve shape of the graph of FIG. 2, it can be seen that the desirable range of toasting occurs at the steepest portion of the curve and thus the difference between an acceptable and unacceptable level of toasting may be a short difference in duration of IR exposure. As will be described in embodiments, such difference may be a second or less.

Referring back to FIG. 1, the toaster 10 includes features that will be described in further detail herein whereby the toasting process of the food product 16 can be closely monitored and the operation of components of the toaster 10 controlled to quickly toast the food product to a predetermined toasting level and ending the toasting process so as to not exceed the predetermined toasting level.

The toaster 10 includes a camera 20 that is oriented relative to the food product 16. While the camera 20 is shown in FIG. 1 in generalized form, more specific exemplary embodiments of such a camera will be disclosed in further detail herein and it will be recognized that embodiments of the toaster 10 may include other features within the camera 20 than those provided in the examples herein. The camera 20 exemplarily acquires digital image captures of the surface of the food product that is being toasted and provides these digital image captures to a processor 22 for analysis and resulting control of the IR sources 12. As depicted, in an embodiment designed to toast two surfaces of the food product 16, a cameras 20 may be directed at each of the surfaces to be toasted.

FIG. 1 depicts the camera 20 in a position arranged centrally to the IR sources 12. It will be recognized that in other embodiments, the IR sources may be located in other positions relative to the IR sources 12, for example, arranged at another position intermediate of the IR source or at a position or positions to the sides of the IR sources 12. While a single camera 20 is provided with each IR source and/or each surface to be toasted, it will be recognized that in embodiments, more than one camera per IR source 12 or surface to be toasted may be used.

In embodiments as described in further detail herein, in addition to the IR wavelength light supplied from the IR sources 12, embodiments of the toaster 10 may also direct supplemental light at the surfaces of the food product from one or more light sources 24. The light sources 24 may operate to emit visible spectrum light, IR spectrum light, UV spectrum light, or specific wavelengths or combinations of wavelengths within this range depending upon the specific embodiments as described herein. In exemplary embodiments, the supplemental light may be provided at a range between 380 nm and 570 nm. Such a range may include some or all of 380 nm-450 nm (e.g. violet), 450 nm-495 nm (e.g blue), and 495 nm-570 nm (e.g. green) spectrum light.

The food product 16 is supported between the IR sources 12 by a support 18. Embodiments of the support 18 may take a number of forms as will be described in further detail herein. These forms of supports may include grates, trays, conveyors, or platforms and may be operable in such forms and as described herein to facilitate loading and ejection of the food product 16 relative to the toaster 10.

The processor 22 is communicatively connected to a computer readable medium (CRM) 26 which is non-transient and upon which is stored computer readable code in the form of computer programs or software configured for execution by the processor 22. It will be recognized that the processor 22 is exemplarily incorporated into any of a variety of known controller circuits, integrated circuits, microcontrollers, or associated circuitry. The processor 22 may be part of a central processing unit (CPU) which includes integrated memory, although in embodiments the CRM 26 may be a separate component or communicatively connected to the processor 22. The processor that accesses software or firmware in the form of computer readable code stored on the CRM 26 as either integrated memory or external memory. The processor 22 executes the computer readable code as an instruction set to carry out the functions as described herein, including the receipt of input, calculations, and outputs as will be described.

The processor 22 receives the digital image captures from the camera 20 and uses image processing techniques as described in further detail herein to monitor the toasting process and provide operational commands to the components of the toaster 10 in a manner so as to achieve a predetermined level of toasting of the food product 16.

Figure 3:
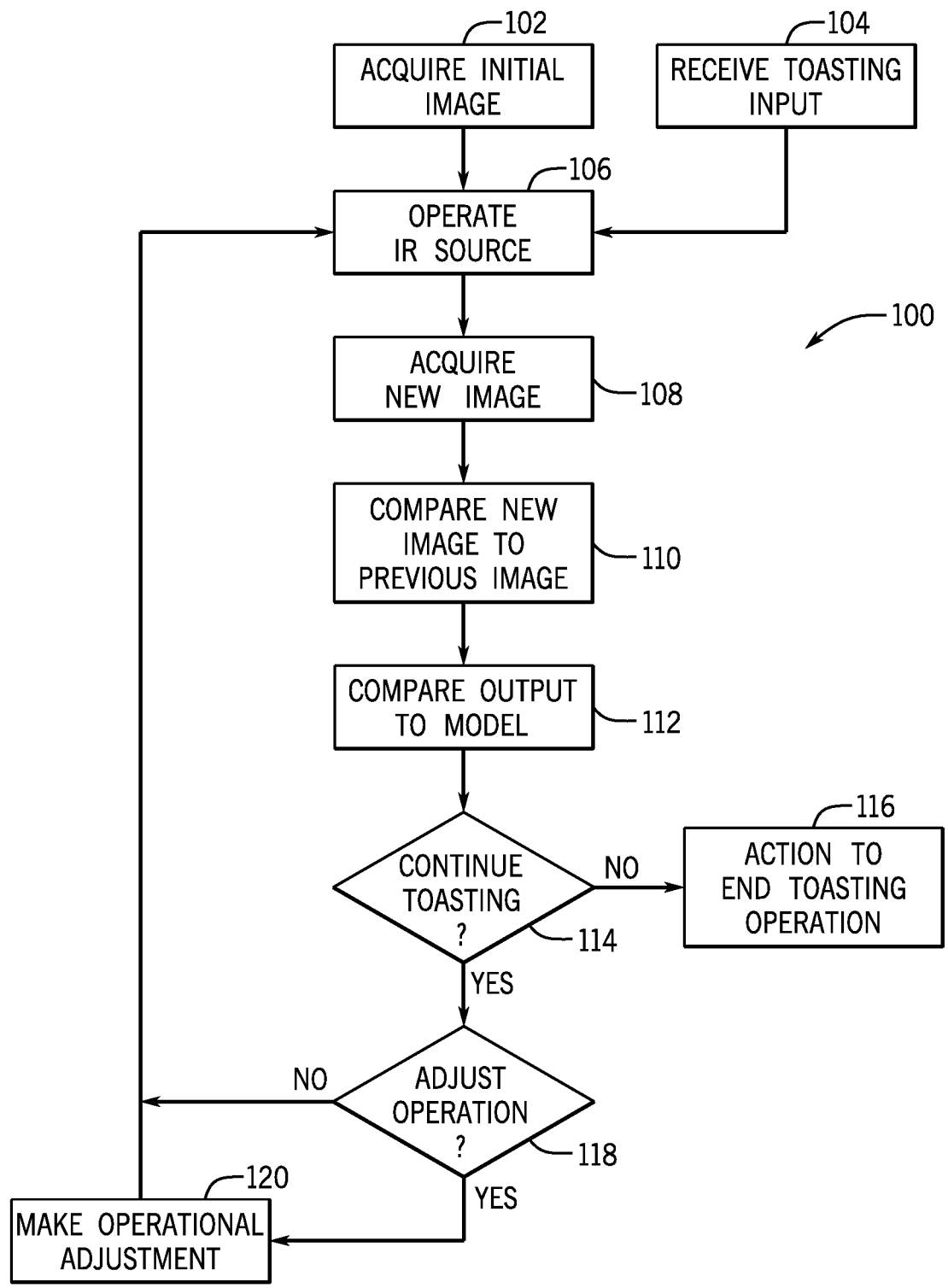
FIG. 3 is a flow chart of an exemplary embodiment of a method of toasting.

FIG. 3 is a flow chart that depicts an exemplary embodiment of method 100 which will be described in further detail herein, for example with reference to the toaster 10 of FIG. 1, although it will be recognized that other embodiments of toasters may be operated to carry out the method 100 as described herein. The method 100 assumes that a food product has been loaded into the toaster. This may be done in manual, automated, or semi-automated manners, for example with the loading of a food product in a tray, slot, and/or conveyor which orients the food product relative to the IR sources 12.

At 102, an initial image of the food product is acquired. In exemplary embodiments, an initial image of each surface to be toasted is acquired, for example, the top and bottom of a food product as depicted in FIG. 1. In embodiments with multiple IR sources, such IR sources may be individually operated relative to the toasting of a particular surface or area. In exemplary embodiments, the digital images acquired in the system and method may be RGB images, although in other embodiments, the images may instead be captured as a grayscale image or converted to a grayscale image. In some embodiments, it has been found that acquisition of grayscale images or conversion of RGB images to grayscale images may improve processing times, while not adversely affecting the analysis, outcomes, and controls as described herein. In other embodiments, particular light spectrum wavelengths may be used. The acquisition of the digital images may be limited to particular light spectrum wavelengths or the acquired color digital image may be processed and or otherwise filtered or limited to the selected wavelengths for analysis.

Optionally, at 104 one or more toasting inputs are received. In an exemplary embodiment, the toaster 10 includes a user interface 28 through which user inputs are received, for example, to identify a food product to be toasted and a desired level of toasting. It will be recognized that while such inputs may be received on a case by case basis, in other embodiments, the toaster 10, and more specifically, the processor 22 of the toaster 10 may be communicatively connected to a kitchen management system (KMS) from which inventory and customer order instructions may be provided, thus providing the toaster with information regarding the food product to be toasted and the desired level of toasting. In still further exemplary embodiments, the toaster 10 may be operated as a dedicated toasting device for a particular bread product (e.g. English muffin, bagel) with pre-established settings for that product and toasting level which are used as a default absent any further input or instruction.

In a still further exemplarily embodiment, the processor 22 may perform image processing whereby image processing techniques and algorithms are applied to the initial image acquired at 102 in order to automatedly identify the food product type that has been loaded into the toaster. Such identification may include, but is not limited to, comparison by the processor of the acquired initial digital images to stored models or standardized images representative of different types of food, and particularly of bread products. A toasting level may be associated with each possible food type and once the food type is identified, the associated toasting level selected for the subsequent toasting operation. While a toasting level may be predefined for each bread product, customer orders or preferences may include a doneness level or adjustment to the predefined toasting level. Such a doneness level may include an indication of lightly toasted which would result in less thermal treatment than the predefined toasting level or darkly toasted which would result in more thermal treatment than the predefined toasting level.

At 106 one or more IR sources of the toaster are operated to apply IR energization to the food product. In an exemplary embodiment, the IR source may be a 1,200 watt heating coil and multiple such IR sources may be arranged to simultaneously toast both sides of the bread product.

While operating the IR source, sequential new images of the bread product are acquired at 108 by the camera 20 arranged in the toaster 10. In an embodiment with multiple cameras 20 including cameras oriented at different sides of the bread product, this acquisition includes images from each camera. In an exemplary embodiment, the new images are acquired at a refresh rate. In an exemplary embodiment, the new images are acquired at a 10 Hz refresh rate, although it will be recognized that in other embodiments more or fewer images may be acquired per second. For each acquired image, at 110 the newly acquired image is compared to a previous image. In a first example, the comparison at 110 is a comparison between the initial image acquired at 102 and the most recent newly acquired at 108. The comparison is exemplarily a difference function whereby the newly acquired image is subtracted from the previously acquired initial image to produce a difference image. For the sake of simplicity in an example, this function in a grayscale analysis will produce a "black" image whereby all of the pixels are value zero with the first image acquisition as the color of the bread product will not have changed during the first 1/10 of a second operation of the IR source. As the product toasts, the surface of the product will become darker and thus have a lower grayscale value, that when subtracted from the initial image, will produce a higher value in the pixels of the difference image. It will be recognized that similar analysis can be done with a full color spectrum of acquired digital images, or may be done within specific wavelengths of acquired images.

In an exemplary embodiment, a mean or average pixel value may be calculated for the difference image and such mean value used to define and determine toasting level. This mean pixel value models the desired toasting outcome to which the difference image is compared at 112. In an exemplary embodiment, the input of the toasting level corresponds to an average pixel value of the difference image at 112, other examples of the toasting level model are described herein, but may include and are not limited to a rate of change model, a percentage change model, or a representative image of a toasted bread product. When evaluating the acquired images against the toasting model, the images may be limited to those portions of the image identified to be the bread product. This may similarly apply to the difference images and the resulting average pixel values of the difference images. In calculating the difference image, in general, the area surrounding the bread product will not change or experience minimal change across the acquired images. Therefore, the boundary of the bread product in the images may be identified and analysis focused on that portion of the images representative of the bread product.

After analysis of the acquired images based upon the toasting model, then at 114, the processor may determine whether to continue toasting or to take an action. At 116, an action to end the toasting function is taken based upon this determination. This action may be to terminate the operation of the IR source. This action may be to mechanically eject the bread product from the toaster. In still further examples, the action at 116 may be to do both. In an example, the action at 116 may be taken when the average pixel value of the difference image matches the average pixel value corresponding to the desired toasting level of the toasting model.

In another example, the desired toasting level may be defined as an average pixel value less than the actual desired toasting level, knowing that if the bread product is not ejected immediately, the heat within the toaster, even after the IR source is turned off, may cause continued toasting of the bread product. In further embodiments, the actions at 116 may include producing an indicating alert, or message that the toasting is complete or near complete. This may provide notice to a next device in an automated system or to a food service worker that the toasted bread product is about to be ejected from the toaster.

Returning to 114, if the bread product still requires toasting, then at 118 a determination is made whether the toaster should maintain the current settings or adjust an operation of the toaster. If an adjustment is to be made, then at 120 such operational adjustment is determined by and commanded by the processor. The toaster continues to operate the IR source, returning to 106 and monitoring the progress of the toasting of the bread product with subsequent images.

In an exemplary embodiment, the toaster 10 may further include blowers which are not depicted in FIG. 1, but are exemplarily described in further detail U.S. Patent Application Publication No. 2010/0239724 entitled "Toaster with Cooling Air Stream", which is herein incorporated by reference in its entirety. It will be recognized that the operation of blowers in coordination with an IR source may serve to slow toasting in a localized area that is impinged with air by the blower. Therefore, in an exemplary embodiment, if it is determined at 118 by the analysis of the images described above that a portion of the bread product is toasting faster than the rest of the product, then operation of a blower or blowers at 120 can limit toasting in an area of blower impingement such that the entire bread product achieve an even level of toasting at the desired level of toasting. In one non-limiting embodiment, such adjustment may be made if one side of the bread product is toasting faster than another side. In a still further exemplary embodiment, blowers may be used if there is a desired instruction to toast the two sides of the bread product to different levels of toasting. In still further exemplary embodiments, the operation adjustment at 120 may be to increase or decrease the electrical energization provided to the IR source or a duty cycle of the energy provided which may serve to increase or decrease the IR energy applied to the bread product. Relatedly, in toasters with multiple IR sources, for example to toast different portions of a bread product or to toast opposite sides of a bread product, the operation adjustment 120 may be applied to a subset of the IR sources, for example to slow the toasting of one side (e.g. a bagel exterior) by blowers or reduced energization while continuing toasting of the opposite side (e.g. a crumb side).

The analysis between images captured may be on a zoned basis in that specific portions of the bread product (e.g. halves, quadrants, concentric circles/rings, etc.) may be comparatively analyzed. In such an example, the bread product in the image is isolated from the background and then a portion or portions of the bread product analyzed for change in color level. This may provide improved resolution of monitoring of toasting progression and refined control of the toasting process. For example, toasting may be terminated if one monitored portion reaches a predetermined toasting level threshold. This may serve to ensure that no portion of the bread product becomes over-toasted. In other embodiments, zoned control of the IR source(s) and/or localized blowers can be used to increase or decrease localized toasting within a portion to promote even toasting of the bread product.

The method returns to 106 where the IR source is operated according to the same operational settings or to the operational adjustments made at 120. The new image is acquired again at 108 and the analysis is continued to be performed, for example at a 10 Hz refresh rate of newly acquired and analyzed images until the toasting is deemed complete.

While one example of the comparison and analysis as may be used by the toaster has been described herein, it will be recognized that there are other comparison functions that may be used in other embodiments as well. In another example, the difference image may be represented as a decimal percentage either above a minimum pixel value (e.g. zero) or below a maximum pixel value (e.g. 255). In such embodiments, the toasting levels may be defined as either percentages of darkness or percentages of lightness. Related to this embodiment, the initial image may be analyzed to evaluate the image/imaged bread product to determine a baseline initial darkness of the imaged bread product. A numerical pixel value difference between the initial value and "black" may define a relative "toasting range". As an example, a piece of white bread may have a significantly larger "toasting range" than a piece of dark rye by this evaluation. The white bread may have an initial pixel value of 220, while a piece of dark rye bread has an initial pixel value of 100. The toasting level may then be defined as a percentage of the toasting range. If the desired toasting level is 50% then a piece of white bread may experience greater absolute change, e.g. 110 for the white bread versus 50 for the dark rye, but both the white bread and dark rye may exhibit a similar relative change.

In an additional example, a rate of change between subsequent images may be calculated. In the comparison at 110, the previous image may be deemed a previously acquired image rather than the initial image and therefore, the difference image may be representative of only the instantaneous change between image acquisitions. Other similar techniques may be used to calculate the current rate of change in the darkness of the monitored surface. At 112, the toasting model used may instead reflect the associated rate of change with each toasting level or to identify a time for the toaster to take action to achieve the desired toasting level.

In a still further example, the new image acquired at 108 may be compared to the previous or initial image at 110 to assist in edge detection or isolation of the bread product in the image. After this processing to place the analysis focus on the bread product in the image, the bread product image is compared to a toasting model representative of an appearance of the bread product at the desired toasting level.

Figure 4C:
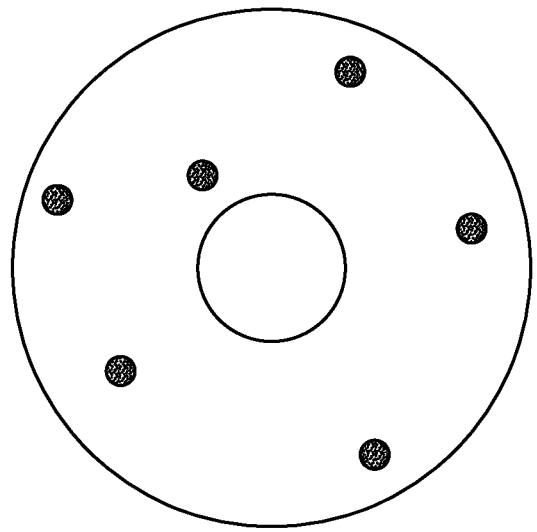
FIGS. 4A-4C depict examples of a bagel toasting.
Figure 4B:
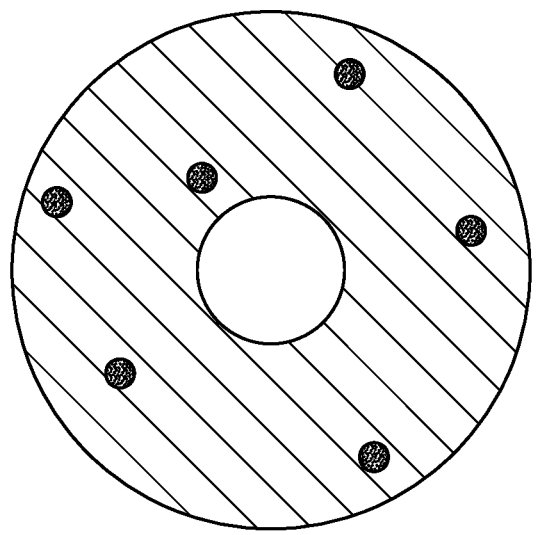
Figure 4A:
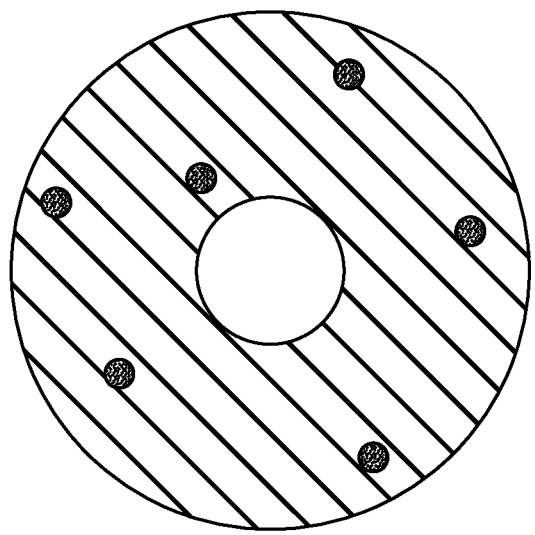

FIGS. 4A-4C exemplarily depict varying levels of toasting of a raisin bagel. A raisin bagel provides an example of some of the challenges that have been overcome by the present disclosure. The raisin bagel progresses from untoasted in FIG. 4A to lightly toasted in FIG. 4B to darkly toasted at FIG. 4C. This exemplarily corresponds to points A, B, and C as found in the graph of FIG. 2. The raisin bagel of FIGS. 4A-4C provides a first challenge having both circular shape and having a hole in the center which therefore results in large portions of the digital image containing irrelevant information to the determination of the toasting level of the bagel. Therefore, in embodiments, image processing may be performed as part of the image acquisition or the comparison to previous images for the purpose of edge detection. Edge detection analysis identifies sharp transitions in the pixel values of the digital image and may be applied to the digital images to identify only those portions that which are related to the bread product being monitored. In the case of the bagel depicted in FIGS. 4A-4C, this includes identifying and removing portions of the image associated with the central hole of the bagel. Further analysis may proceed with only those portions of the digital image determined to be associated with the bread product. In embodiments, because the average pixel value across the analyzed portion of the digital image may be used, the analysis may err on the side of removing part of the digital image that is associated with the bread product to ensure that only portions of the digital image associated with the bread product are analyzed. The use of edge detection and focusing the analysis on only relevant portions of the digital image associated with the bread product can further simplify the digital image making it less computationally intensive to further analyze the digital images. As noted above, in some embodiments only a portion of the bread product in the digital image may be analyzed.

As a still further example, the raisin bagel includes discontinuities in the darkness values of pixels within the digital image as a result of the raisins. These localized dark areas undesirably increase the overall average pixel darkness across the entire digital image but also do not exhibit the same change in darkness as the bagel is toasted. Therefore, in embodiments due to the comparison between a current image and a previous image, the resulting difference image provides a more accurate reflection of the change in surface color of the bagel as compared to a determination based solely upon the currently acquired image.

However, the localized darkened areas associated with the raisins also do not exhibit the same change in color as the rest of the bread product, therefore, in a further example the two described techniques may be combined whereby edge detection is further used to identify the localized darkened portions of the raisins and remove those portions of the digital images from consideration in assessing the toasting level of the bread product.

Supplemental light sources 24 (FIG. 1) are used to illuminate the surface of the bread product that is being monitored. It will be recognized that the IR sources, which as noted above are exemplarily 1,200 watt heating coils, also give off visible spectrum light in addition to IR spectrum light. In order to maintain a consistent acquired image and representation of monitored surface darkness, supplemental light is added to the surface at an intensity that washes out any light that may be produced by the IR source. In exemplary embodiments, the supplemental light sources may produce white visible light, IR spectrum light, UV spectrum light, or any of the above, also including, but not limited to specific ranges of light wavelengths, for example, to provide specific colors of supplemental light. In examples, but not limiting on the wavelengths of light that may be used, the supplemental light may include the provision of green (495 nm-570 nm), blue (495 nm-570 nm), and/or purple (380 nm-450 nm) light in an effort to wash out the orange or red-orange hue that is common with resistive wire IR energy sources. In still further exemplary embodiments, the intensity of this supplemental light may be counteracted in the camera by operating the camera with a fast shutter speed so as to not overexpose the acquired image. In still further exemplary embodiments, the provision of the supplemental light may be coordinated with the acquisition of each image and therefore, the supplemental light need not be continuously applied within the toaster during times in which the camera is not acquiring images.

Figure 5:
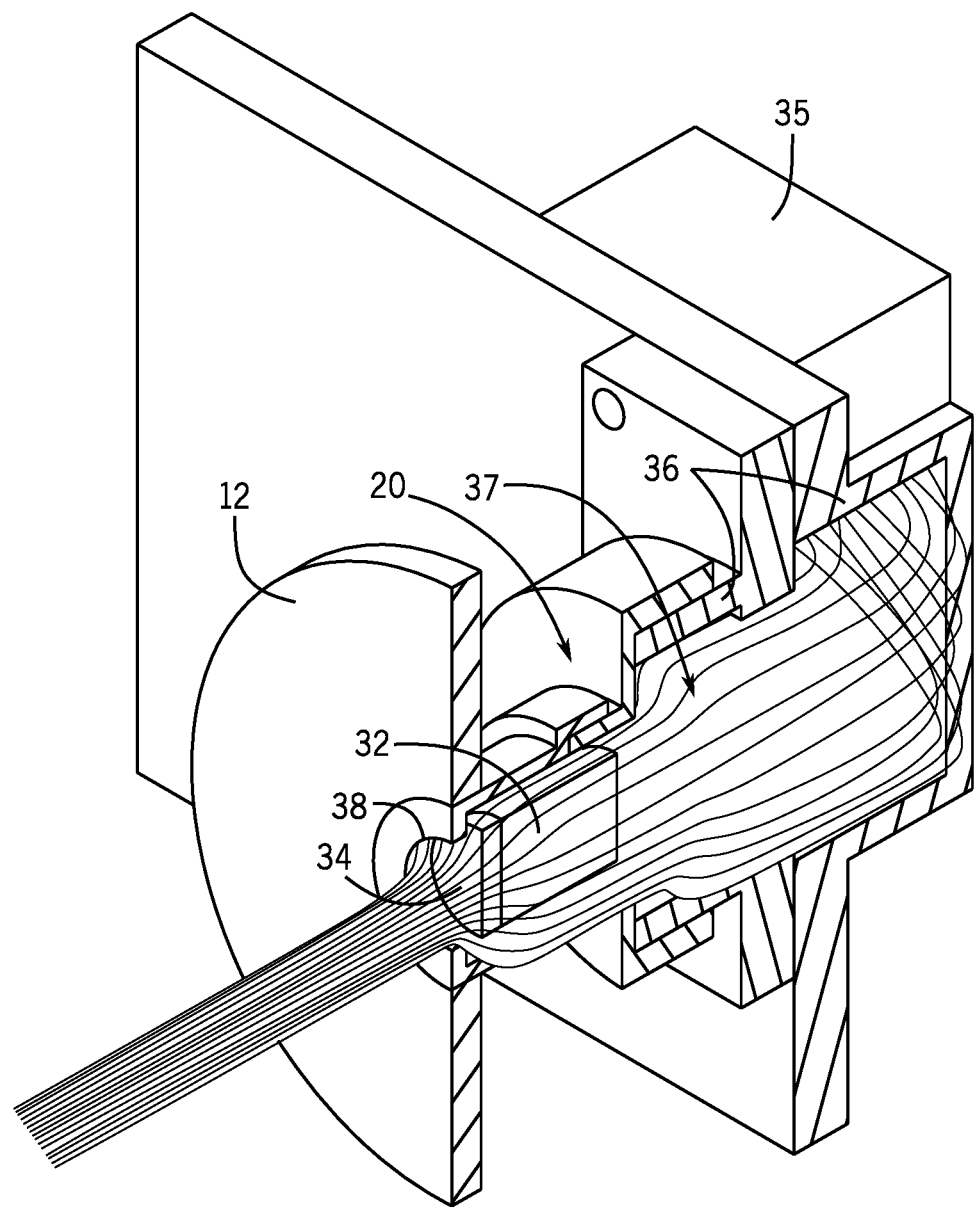
FIG. 5 depicts an exemplary embodiment of a camera.

FIG. 5 depicts an exemplary embodiment of a camera 20. The camera 20 may be arranged centrally to the IR source 12. Exemplarily, the camera 20 uses a two-megapixel CMOS optical sensor 32 and the optical sensor 32 is fitted with a wide-angle lens 34. In embodiments, a wide angle lens 34 helps to enable the optical sensor 32 and associated camera electronics to be positioned in close proximity to the surface of the bread product being monitored while still being able to capture an image, either of the entire monitored surface, or a significant enough portion so as to accurately monitor the toasting progress. As mentioned earlier, in embodiments, multiple of these optical sensors 32 may be arranged to capture different views or portions of the bread product.

The camera further faces challenges of keeping the lens clean while the optical sensor 32 and wide-angle lens 34 are in close proximity to food products. Additionally, the optical sensor 32 is located in close proximity to the IR source 12 and therefore, the thermal exposure to the optical sensor 32 must also be limited. To address these challenges, the toaster may include a source of forced gas 35, for example, a compressor, blower, or supply of compressed gas that is provided through ducting 36 to form a curtain or flow of gas 37 about the optical sensor 32 and the lens 34. The flow of gas 37, which may be air or an inert gas such as nitrogen, may further be directed through an orifice 38 so as to increase the velocity of the flow of air. This flow of air does not obstruct the digital images acquired by the optical sensor but does prevent debris from the food being toasted from contacting the lens or the optical sensor. Additionally, the flow of air helps to cool the optical sensor 32, maintaining it at a temperature suitable for operation despite the proximity of the optical sensor to the IR source. In another example, the lens 34 may extend proud of the orifice in an arrangement that maintains a similar protective flow of gas 37 about the lens 34.

In a still further exemplary embodiment, the processor of the toaster may further calculate and apply a latent heat adjustment factor when determinations are made regarding whether the toasting process should be terminated. It has been observed that when the toaster operates through a toasting cycle, latent heat from the IR source is retained within the toaster. This latent heat dissipates over time, but if a subsequent toasting cycle is initiated prior to the dissipation of this latent heat, then the additional latent heat within the toasting system accelerates the toasting process in a subsequent toasting cycle. Therefore, the processor can monitor a time between the toasting cycles. The processor can also operate to make a determination of latent heat within the toaster, for example based upon one or more temperature sensors within the toaster, or based upon the known thermal output of the IR sources combined with modelled thermal dynamics of the toaster and the toasted bread product to arrive at an estimation of latent heat within the toaster when a new toasting cycle is initiated. Therefore, in embodiments wherein the processor has determined that latent heat remains within the toaster at the start of a toasting cycle, the processor may adjust the toasting model used to shorten the expected times between various toasting levels.

Figure 6A:
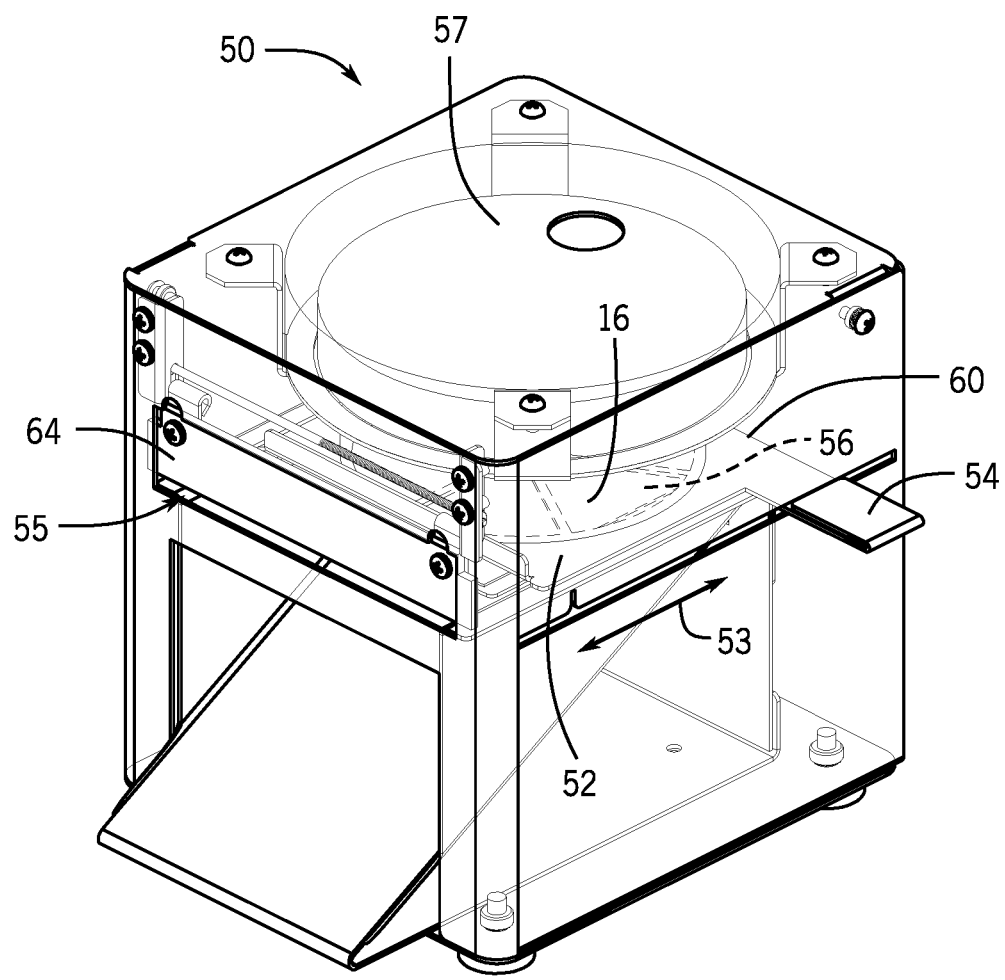
FIGS. 6A-6C depict an exemplary embodiment of a toaster.
Figure 6B:
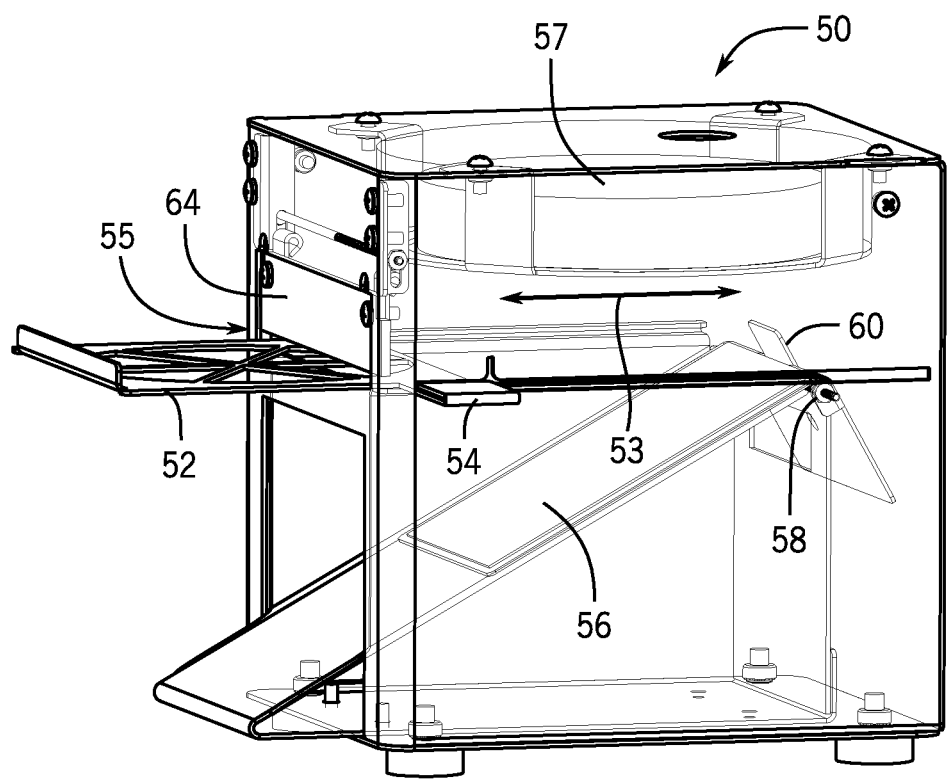
Figure 6C:
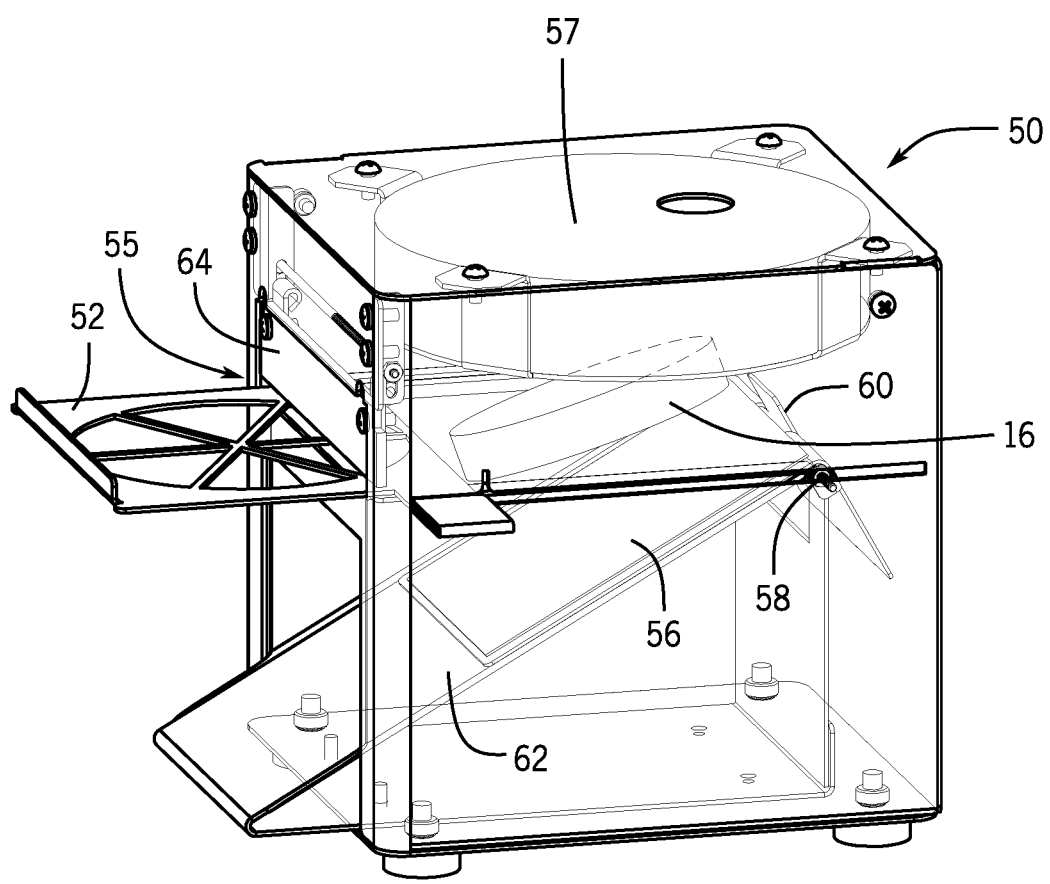

FIGS. 6A-6C depict an example of a toaster 50. It will be understood that in the description of FIGS. 6A-6C provided herein will focus on the mechanical systems for loading and unloading the toaster, while the electrical components and IR source operation may exemplarily be similar to that as described above with respect to FIG. 1. The toaster 50 includes a tray 52 that translates in the direction of arrow 53 through an opening 55 into and out of the interior of the toaster 50. The bread product is loaded on the tray 52 and the user operates a handle 54 to slide the tray 52 containing the bread product through the opening 55 into the toaster 50. The toaster 50 further includes a door 64 across the opening 55 that is operable to limit access into the toaster 50. When the tray 52 is inserted into the toaster 50 with a bread product to be toasted, the door 64 closes behind the tray 52. The door 64 may translate or pivot relative to the opening 55. In an exemplary embodiment, wherein the door 64 pivots, the door 64 may be spaced such that the tray 52 can pass below the door 64 and the door 64 pivots inwardly into the interior of the toaster 50. The door 64 exemplarily provides multiple functions as described herein. As a first function, the door 64 closes to block a user from access into the interior of the toaster when the IR sources are operating to toast the bread product.

FIG. 6B exemplarily shows the toaster 50 in a loading position, ready to receive a bread product on the tray 52. The toaster 50 exemplarily includes a bottom heater 56 connected to a pivot 58. As the tray 52 is translated into the toaster 50 in the direction of arrow 53, the tray 52 engages a lever 60 as the tray 52 is slid into position in the toaster 50. Engagement of the tray 52 with the lever 60 forces the connected bottom heater 56 to rotate into position relative to the tray 52 with the bread product positioned on the tray above the bottom heater 56. The toaster 50 operates as described in the present disclosure until the processor determines that the toasting process should be terminated.

Upon a determination to terminate the toasting process, the tray 52 is slid out of the toaster 50. This is exemplarily depicted in FIG. 6C and may be performed manually with the operation of the handle 54, for example, wherein the IR source is automatedly turned off. The tray 52 may also be moved out of the toaster as part of an electromechanical process of the toaster actuated by the processor determining to terminate the toasting process as described above. By operating the tray to exit the toaster 50, the tray 52 disengages from the lever 60 and the lower IR source 56 is separated from the tray 52, for example in position against a ramp 62. The door 64 may remain in place while allowing the tray 52 to pass through the opening 55 below the door 64. The door 64 blocks the bread product within the toaster 50 separating the bread product from the tray 52 and the bread product drops onto the lower heater 56 and/or the ramp 62 for ejection from the toaster 50.

Figure 7:
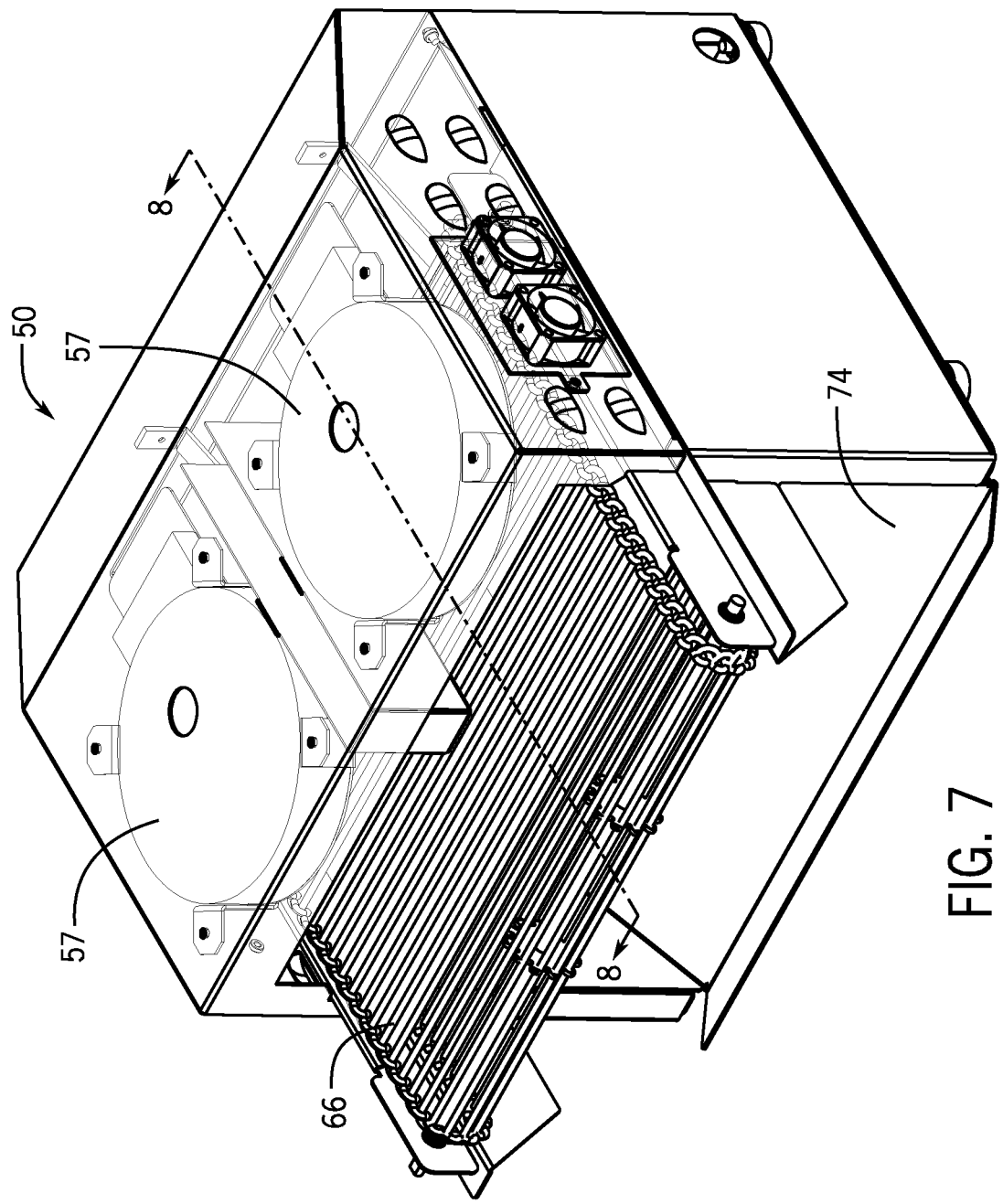
FIG. 7 depicts a further exemplary embodiment of a toaster.
Figure 8:
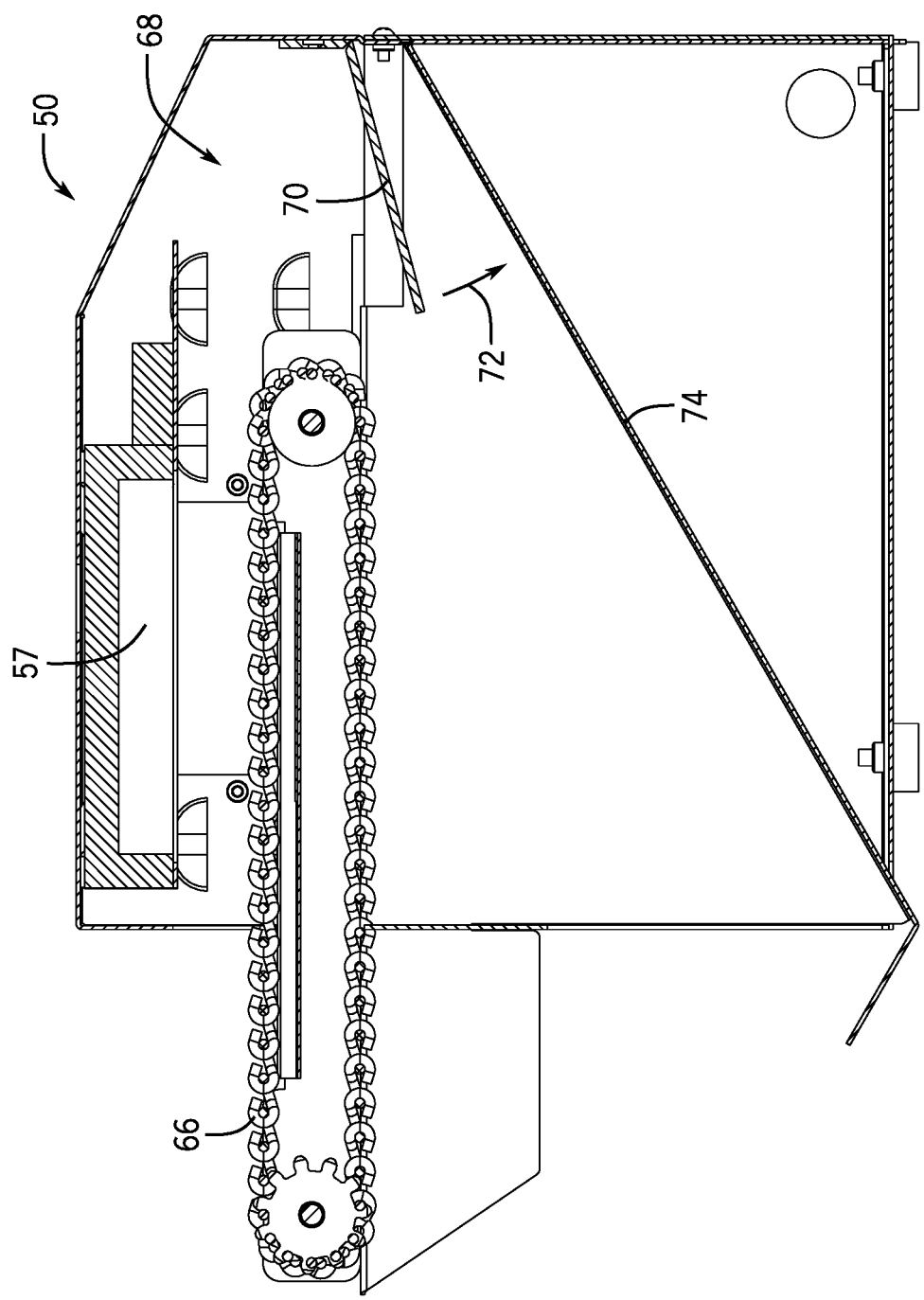
FIG. 8 is a cross-sectional view taken along line 8-8 of FIG. 7.

FIGS. 7 and 8 depict another example of a toaster 50. FIG. 8 is a cross-sectional view of the toaster 50 as taken along line 8-8 of FIG. 7. As with the toaster 50 described above with respect to FIGS. 6A-C, FIGS. 7 and 8 exemplarily depict mechanical features of the toaster 50, primarily a driven conveyor 66 which operates to move a bread product into the toaster 50 and to extract the bread product from the toaster 50 when the desired toasting level has been reached. In an exemplary embodiment, bread products to be toasted are positioned on the conveyor 66 exterior of the toaster 50 and the conveyor 66 operated, for example with a motor drive (not depicted), to circulate the bread product into the toaster and into a position relative to a heat source 57 or sources within the toaster. While FIG. 7 depicts a single conveyor 66 associated with two IR sources 57, exemplarily creating two toasting paths for parallel toasting of bread products, it will be recognized that each toasting path may include its own independently operated conveyor. In an example, the two toasting paths may be used to simultaneously toast crown and heel portions of a bread product. Additionally, while the toaster 50 of FIG. 7 includes a single IR source 57 for each toasting path, it will be recognized that an additional IR source (not depicted) may be positioned intermediate the conveyor 66 to toast the other side of the bread product. The toaster 50 operates in the manner as described herein until the processor determines to terminate the toasting process whereby the processor may turn off the one or more IR sources and operate the conveyor 66 to eject the bread product.

As described above, in a configuration of a toaster 50 as depicted in FIGS. 7 and 8, the toasted bread product may still be exposed to heat, for example, the latent heat of the toaster 50, while the conveyor 66 is operated to remove the toasted bread product from the toaster 50. Therefore, the toasted bread product may continue to toast and/or receive thermal treatment after the IR source 57 is turned off. This additional exposure may be modeled into the definition of the desired toasting level and the determination to turn off the IR source 57 and operate the conveyor 66 to eject the toasted bread product. The toaster 50 includes a compartment 68 internal the toaster 50 from the conveyor 66. The toasted bread product extends into the compartment 68 as the bread product is rotated off of the conveyor 66. A cantilevered lever 70 catches the toasted bread product in the compartment 68 and flexes in the direction of arrow 72 to receive and redirect a lagging end of the toasted bread product and to direct the bread product down ramp 74 to exit the toaster 50. The compartment 68 and the cantilevered lever 70 function to maintain the toasted bread product in the same orientation as it was positioned on the conveyor 66 originally and has toasted such that the toasted bread product is ejected in a consistent orientation for collection by a kitchen worker or automated device for a next step of an order assembly.

Figure 9A:
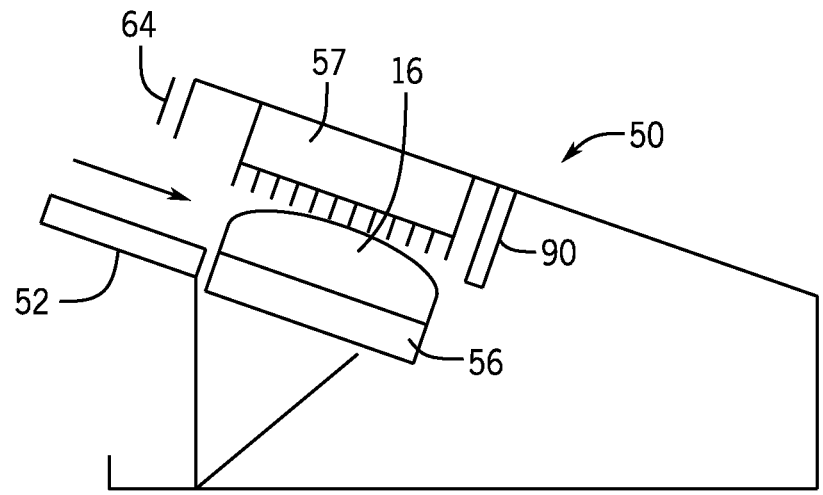
FIG. 9 depicts another exemplary embodiment of a toaster.
Figure 9B:
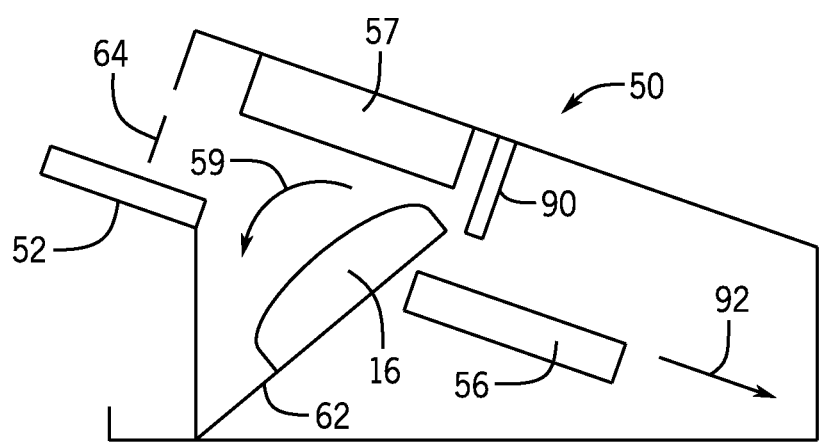

FIGS. 9A and 9B depict another example a toaster 50. Similar to the descriptions above with respect to FIGS. 6-8, FIG. 9 exemplarily depicts the mechanical features of the toaster 50, other features as depicted and described above, for example with respect to FIGS. 1 and 2 will be recognized to be exemplarily used within the toaster 50. The mechanical features shown in FIGS. 9A and 9B relate to the loading and unloading of the bread product to be toasted and exemplarily depict a process of loading and unloading a bread product 16 for toasting by the toaster 50. The bread product 16 is exemplarily placed on a loading tray 52 that extends outwardly from the toaster 50. In an embodiment, the loading tray 52 may be stationary or may be operable for movement relative to the toaster 50. The bread product 16 enters the toaster 50, for example by a gravity feed and is held in position between a stationary top IR source 57 and a movable lower IR source 56. In an embodiment, the bread product 16 is held in position relative to the top IR source 12 and the movable lower IR source 56 by a stationary backstop 90. In another embodiment, a retaining feature on the top IR source 57 or the movable lower IR source 56 engages the bread product 16 to hold it in position. Another type of retaining feature may be located within the toaster 50 for this purpose as well. A door 64 may be movable across the opening 55 to further limit access to the interior of the toaster 50 during operation.

The top IR source 57 and the movable lower IR source 56 operate as described to toast the bread product 16, although it will be recognized that in other embodiments, only the top IR source 57 may be used, for example in configurations to toast bagels, roll crowns or heels, English muffins, or the like. Upon completion of the toasting process, as also described, a movable support, which may include, or have included the lower IR source 56 in a two IR source embodiment, slides or otherwise moves in the direction of arrow 92 within the toaster 50. If the toasted bread product is not already in engagement with the backstop 90, this movement causes the toasted bread product to contact the backstop 90. As the movable lower IR source 56 is further slid from beneath the toasted bread product 16, the bread product 16 rotates downward in the direction of arrow 59 to an exit ramp 62 which directs the toasted bread product 16 out of the toaster 50. After the toasted bread product 16 is dispensed from the toaster 50, the movable lower IR source 56 returns to its original position. The door 64 may open to accept a new bread product 16 into the toaster 50 to be toasted. It will be recognized that rather than the IR source 56 or movable support moving relative to the backstop 90, the backstop 90 may be the movable support, supporting the bread product 16 at a position relative to the top IR source 57 and then moving, either by pivoting or retracting to direct the toasted bread product 16 out of the toaster, for example as shown in FIG. 8.

Figure 10:
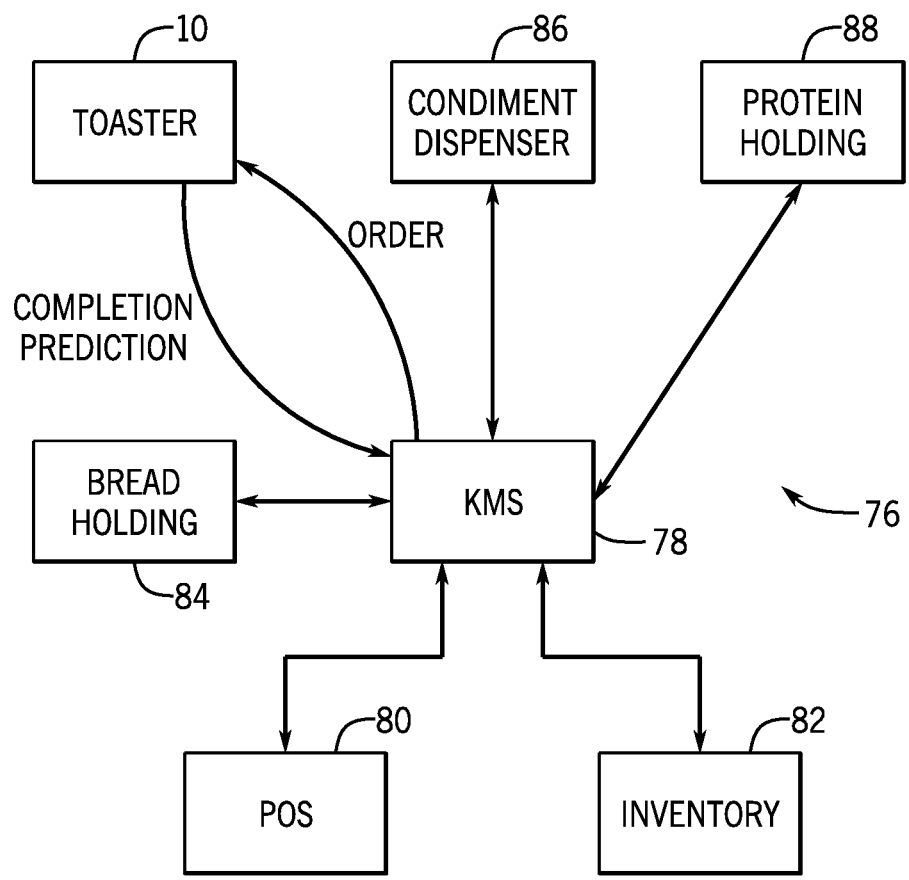
FIG. 10 is a system diagram of an exemplary embodiment of a kitchen system including a toaster.

FIG. 10 depicts an exemplary embodiment of a kitchen system 76. It will be recognized that the kitchen system 76 depicted in FIG. 10 is for exemplary purposes and other devices or systems as will be recognized by a person of ordinary skill in the art that may exist within a kitchen system 76 as described herein may also be used due to the present disclosure. The kitchen system 76 includes a toaster 10 as has herein been described. The toaster 10 is communicatively connected to a kitchen management system (KMS) 78. It will be recognized that in exemplary embodiments, the KMS 78 exemplarily coordinates communication between other devices within the kitchen and/or other information systems within the kitchen, some of which may be located locally to the kitchen or may be located remotely as through a cloud computing configuration and arrangement. The KMS 78 exemplarily coordinates with a point-of-sale (POS) system 80 which operates to receive customer orders and monitor customer order completion and delivery. The KMS 78 also coordinates with an inventory management system 82. The inventory management system 82 may operate to track the inventory and use of foods and supplies within the kitchen. While the KMS 78, POS 80, and inventory management system 82 have been depicted as separate components, it will be recognized that in some embodiments these components may be configured individually or may operate as a single computer/software system.

In addition to the toaster 10, the kitchen system 76 may also include other devices that include, but are not limited to bread holding 84, condiment dispensing 86, and protein holding 88. These other devices may be communicatively connected to one another either directly or through the KMS 78 as depicted in FIG. 10. The bread holding 84 may exemplarily store the bread products prior to use and/or toasting for use. The condiment dispenser 86 may operate to automatedly dispense condiments to a toasted bread product to facilitate completion of a customer order. Protein holding 88 may operate to hold cooked proteins in an environmental condition such as prolong flavor, texture, and safety for use in assembling customer orders, for example with toasted bread products. In exemplary embodiments, the KMS coordinates with the toaster 10 to provide the toaster 10 with order information exemplarily obtained from the POS 80 and to give the toaster 10 input instructions regarding the type of bread product being toasted and the desired level of toasting for the bread product to complete the customer's order. In exemplary embodiments, the toaster 10 returns information to the KMS 78 for example to provide a predicted time of completion of the bread product to be toasted and/or a notification that the ordered bread product has been toasted. This notification can be used to update and manage the inventory system 82, but also the completion prediction and/or indication of completed toasting may be used coordinate the operation of other devices within the kitchen system 76. For example, a notification may be made a protein holding station 88 that the bread product has been toasted and is ready to receive the held protein. Similarly, the condiment dispenser 86 may be operated to receive the toasted bread product and to dispense condiments thereon according to a customer's order from the POS 80. In exemplarily and non-limiting embodiments, the toaster 10 may be connected to the condiment dispenser 86, for example by a conveyor or by physical arrangement of the condiment dispenser 86 proximate to the toaster 10 such that the toasted bread product is ejected from the toaster 10 into the condiment dispenser for the automated dispense of condiment thereon. Additionally, the bread holding device 84 may be operated in connection with a received toasting completion prediction and/or indication of toasting completion to coordinate the dispense of a next bread product to be toasted from the bread holding device 84 either directly into the toaster 10 for toasting or for notification to a kitchen worker of the next bread product to be toasted by the toaster 10.

As noted in the embodiments described herein, the processor may operate using the determined current level of toasting of the bread product in coordination with a model of the expected toasting process to provide an estimate of when the toasting process will be complete or to determine that the toasting process is complete and the bread product is to be ejected. Thus, with these determinations, the processor of the toaster 10 can help to coordinate termination of a toasting process and dispense of the toasted bread product while subsequently facilitating loading of the next bread product to be toasted into the toaster 10. Also noted above, within a toasting process, the processor may determine that adjustments to the toasting process should be made, for example to at a flow of air into the toaster, adjust a duty cycle of the IR source or sources, to inject microwaves into the toaster, or to operate the toaster to provide zoned control of the toasting process. In still further exemplary embodiments, the toaster may either integrated with components for the addition of foods and/or condiments to the toasting bread product or directly connected to components for adding additional foods or condiments, for example as described above with respect to the condiment dispenser 86. In a still further exemplary embodiment, the processor may use the determination of the toasting completion prediction or determined remaining toasting time to add a food or condiment directly to the bread product during the toasting process. This may exemplarily include the addition of a protein within the toaster, the addition of butter, or cheese.

In still further exemplary embodiments, each of the difference images and/or mean brightness of the difference images may be stored to produce a data set or graph of the change in brightness of the difference image during the toasting process. As depicted in FIG. 2, the toasting process generally occurs over an S-shaped curve. Thus, the toasting process can be characterized in three phases: an initial pre-toasting phase (I), an active toasting phase (II), and an over-toasting phase (III). In the pre-toasting phase (I) the humidity within the bread product is released, drying out the bread product. Once a sufficient amount of humidity from the bread product has been released, then the carbohydrates and proteins on the surface of the bread product can begin to oxidize, darkening in color representative of the active toasting phase (II). However, once the carbohydrates on the surface of the bread product have oxidized completely, this characterizes the over-toasting phase (III) or burning of the bread product. It has been recognized that the humidity of a bread product is related to that product's freshness and quality. Therefore, the length of time that a particular bread product spends in the pre-toasting phase is related to the freshness and/or quality of that bread product, relative to other bread products of the same type. Therefore, embodiments of the toaster can additionally monitor the quality of the input bread product and use this further determination to coordinate with the kitchen management system 78 and/or the inventory management system 82. In an exemplary embodiment, this can provide an indication to the inventory management system 82 that the bread is within or outside of a defined quality specification (e.g. bread humidity). In another embodiment, the toaster may determine that the bread input into the toaster is of an insufficient quality and operates to terminate the toasting process and provide an indication that the bread product should not be used as it is deemed to be of insufficient quality. Such information may also be communicated to the bread holding machine 84 and/or the POS 80 for coordination between those devices and systems for product management.

In still further exemplary embodiments, additional sensors, monitors, or manual or automated inputs may be provided into the toaster 10 and such inputs may be used to further refine the toasting model as used or otherwise adjust the operation of the toaster. In embodiments, the toaster may identify an initial temperature of the input bread product, a humidity of the bread product, a density, a mass, a surface roughness, a height, or a volume of the input bread product. Some or all of these may be used in identifying a bread product type and/or used to select an initial setting for the operation of the toaster to toast the input bread product. In still further exemplary embodiments, the toaster may measure or receive input values of ambient temperature, ambient humidity, or ambient altitude as these may also affect the toasting process. In still further exemplary embodiments, the toaster may exemplarily self-monitor the operation or thermodynamics of the toaster itself, including, but not limited to the received voltage, the power used, the heating element resistance, the heating system mass, the control system response time, and/or the bread product load or eject position. Monitoring one or more of these operational values may help to refine operation over time and to adjust for system wear, wear on the heating element. In still further exemplary embodiments, the system may receive inputs as to the air flow within the toaster regarding temperature, speed, or humidity of the air flow within the toaster and, as described above, the latent heat within the toaster between toasting cycles may be monitored.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A toaster comprising:
   a support configured to hold a bread product;
   an infrared (IR) source arranged relative to the support and operable to direct IR energy to the bread product on the support;
   a light source arranged relative to the support and operable to illuminate the bread product on the support while the IR source operates to direct IR energy;
   a camera that operates to capture images of the bread product on the support;
   a processor that receives the images from the camera, the processor analyzes successive images received from the camera and based upon the analysis operates the IR source to achieve a predetermined toasting level of the bread product; and
   wherein the IR source is configured as an annulus and the camera is positioned centrally to the IR source.

2. The toaster of claim 1, wherein the processor operates the IR source to terminate operation directing IR energy when the predetermined toasting level is reached.

3. The toaster of claim 1, wherein analysis by the processor comprises calculating a difference image using a current acquired image of the images from the camera and evaluating the difference image based upon the predetermined toasting level.

4. The toaster of claim 3, wherein the processor isolates pixels associated with the bread product in each of the images received from the camera, and evaluates the isolated pixels of the difference image based upon the predetermined toasting level.

5. The toaster of claim 4, wherein the processor calculates an average pixel value from the isolated pixels of the difference image and compares the average pixel value to the predetermined toasting level.

6. The toaster of claim 5, wherein the isolated pixels of the difference image each have a pixel difference value and the average pixel value is an average of the pixel difference values.

7. The toaster of claim 5, wherein the isolated pixels of the difference image each have a normalized difference value and the average pixel value is an average of the normalized difference values.

8. The toaster of claim 7, wherein the normalized difference values are normalized to an expected toasting range based upon an identification of a type of the bread product.

9. The toaster of claim 4, wherein the processor applies edge detection to the captured images from the camera to isolate pixels in each of the images associated with the bread product.

10. The toaster of claim 1, wherein the processor receives an input indicative of the predetermined toasting level.

11. The toaster of claim 10, wherein the input is an identification of a bread product type and doneness, and the processor is communicatively connected to a kitchen management system which receives a customer order, identifies a toasted bread product for the received customer order and electronically communicates the bread product type and doneness of the toasted bread product for the received customer order to the processor.

12. The toaster of claim 1, wherein the light source operates to illuminate the bread product on the support and the camera operates to capture images of the bread product on the support while the IR source simultaneously operates to direct IR energy to the bread product on the support.

13. The toaster of claim 1, wherein the support is a tray configured to hold the bread product relative to the IR source and the processor operates the tray to release the bread product when the predetermined toasting level is reached.

14. The toaster of claim 1, wherein the support is a conveyor operable to receive the bread product and move the bread product into a position relative to the IR source, the processor operates the conveyor to move the bread product away from the IR source when the predetermined toasting level is reached.

15. The toaster of claim 1, wherein the camera comprises a wide-angle lens.

16. A toaster comprising:
a support configured to hold a bread product;
an infrared (IR) source arranged relative to the support and operable to direct IR energy to the bread product on the support;
a light source arranged relative to the support and operable to illuminate the bread product on the support while the IR source operates to direct IR energy;
a camera that operates to capture images of the bread product on the support;
a processor that receives the images from the camera, the processor analyzes successive images received from the camera and based upon the analysis operates the IR source to achieve a predetermined toasting level of the bread product; and
a forced gas source and a duct that opens about the camera between the camera and the IR source to produce a flow of forced gas about the camera.

17. The toaster of claim 16, wherein the light source operates to illuminate the bread product on the support and the camera operates to capture images of the bread product on the support while the IR source simultaneously operates to direct IR energy to the bread product on the support.

18. The toaster of claim 16, wherein the processor operates the IR source to terminate operation directing IR energy when the predetermined toasting level is reached.

19. The toaster of claim 16, wherein analysis by the processor comprises calculating a difference image using a current acquired image of the images from the camera and evaluating the difference image based upon the predetermined toasting level.

20. The toaster of claim 16, wherein the support is a tray configured to hold the bread product relative to the IR source and the processor operates the tray to release the bread product when the predetermined toasting level is reached.

21. The toaster of claim 16, wherein the support is a conveyor operable to receive the bread product and move the bread product into a position relative to the IR source, the processor operates the conveyor to move the bread product away from the IR source when the predetermined toasting level is reached.

* * * * *